United States Patent Office 3,804,961
Patented Apr. 16, 1974

3,804,961
PACKAGING TOMATOES IN CARBON DIOXIDE PERMEABLE FILM
Alfred S. Cummin, Westfield, Henryk Daun, New Brunswick, and Seymour G. Gilbert, and Yair Henig, Piscataway, N.J., assignors to Borden, Inc., Columbus, Ohio
No Drawing. Filed Mar. 31, 1972, Ser. No. 240,237
Int. Cl. B65b 25/04
U.S. Cl. 426—415
8 Claims

ABSTRACT OF THE DISCLOSURE

The ripening time of tomatoes can be prolonged and the period of time they remain ripe can be extended if the tomatoes are separated as to their degree of ripeness and packaged in a film which is at least three times as permeable to carbon dioxide as to oxygen and has a permeability to oxygen and carbon dioxide specifically selected for the degree of ripeness of the tomatoes. Green tomatoes are packaged in films having an oxygen permeability of about 1,000 to about 3,000 and a carbon dioxide permeability of about 5,000 to about 20,000. Pink tomatoes are packaged in film having an oxygen permeability of from about 200 to about 3,000 and a carbon dioxide permeability of from about 1,500 to about 20,000. Red ripe tomatoes are packaged in films having an oxygen permeability of from about 50 to about 3,000 and a carbon dioxide permeability of from about 500 to about 20,000.

BACKGROUND OF THE INVENTION

This invention is directed to packaging tomatoes in a film which has permeability characteristics matching the tomatoes requirements for oxygen and the tomatoes requirements to expel carbon dioxide.

It is known that the storage life of green tomatoes can be prolonged by controlling the atmosphere surrounding the tomatoes. Thus, the storage life of tomatoes has been prolonged by packaging the tomatoes when green in a polyethylene bag. When it was desired to ripen the tomatoes, the bag was opened and the tomatoes exposed to a normal atmosphere. The prior art is exemplified by U.S. Pat. 3,450,544 of Badran.

Some of the disadvantages of the prior art are: (1) if the tomatoes are packaged when green in an imperforated film of low oxygen permeability, the package must be opened in order to ripen the tomatoes; and (2) the prior art techniques are not applicable for pink or ripe tomatoes.

Tomatoes are generally shipped in from the field to central distribution points. If the tomatoes have been hand picked, they are generally in various stages of ripeness. Tomato pickers are not uniform in their selection of the degree of the ripeness desired. To overcome this problem, new varieties of tomatoes are being developed for mechanical pickers. The goal is to have all of the tomatoes ripen at the same time so that the mechanical tomato picker can pick the entire field at the same time. Again as with hand picked tomatoes, there is a significant variation in the degree of ripeness of the tomatoes picked at the same time. Absolute uniformity of ripening time has not been achieved.

SUMMARY OF THE INVENTION

After tomatoes are separated at the central distribution points as described above, they are packaged depending upon their degree of ripeness in films of varying permeabilities. The ripest tomatoes are packaged in films which have a relatively low permeability to oxygen. The green tomatoes are packaged in a film which has a relatively high permeability to oxygen. The pink tomatoes are packaged in a film which has a relatively intermediate permeability to oxygen. The permeability is decreased to a degree to extend the storage life.

Another requirement is that the films have a high ratio of permeability of carbon dioxide to permeability of oxygen. The presence of excess carbon dioxide in the tomato package is undesirable as it prevents the tomatoes from ripening properly.

DESCRIPTION OF THE PREFERRED EMBODIMENTS

Tomatoes can be packaged in films of varying permeabilities, depending upon the stage of maturity of the tomatoes, to prolong their ripening time and to prolong the length of time which they remain ripe. This is accomplished by separating the tomatoes into the following three main groups:

(1) Green tomatoes and green tomatoes with pink on the blossom end,
(2) Pink tomatoes,
(3) Red tomatoes.

When there is an overlap of permeability requirements, separation is not required. In addition, more than three groups may be found in the separation.

The tomatoes are then wrapped in an imperforate gas permeable film having a ratio of carbon dioxide permeability to oxygen permeability of at least 3.0 and a permeability corresponding to each group of tomatoes as follows:

(1) Oxygen permeability of about 1,000 to 3,000 and a carbon dioxide permeability of about 5,000 to about 20,000,
(2) Oxygen permeability of about 200 to 3,000 and carbon dioxide permeability of about 1,500 to about 20,000,
(3) Oxygen permeability of about 50 to 3,000 and carbon dioxide permeability of about 500 to about 20,000.

Factors which influence the permeability selection include storage life and the color desired at the point of destination.

The film is then sealed around the tomatoes so as to prevent any gas from entering or leaving the package by any means other than permeating the film. The tomatoes are then stored in the packages. The package delays the ripening time of the tomatoes so packaged and if they are ripe or when they become ripe in the package, maintains them in a ripened condition over a relatively longer time than unpackaged tomatoes. This allows more time for shipment and also more time for display of the tomatoes in the market. This also allows for the tomatoes to arrive in the desirable degree of ripeness and maturity color.

As a practical matter, it is preferred that the films have a permeability ratio of carbon dioxide to oxygen of about 4 to 10. Less than 4 is undesirable due to carbon dioxide build-up and greater than 10 is difficult to achieve due to film permeability characteristics.

The preferred oxygen permeabilities of films used to package the various groups of tomatoes is as follows:
Group 1—About 1,000 to 2,500.
Group 2—About 300 to 2,500.
Group 3—About 75 to 2,500.

The preferred carbon dioxide permeabilities can be determined by multiplying the above oxygen permeabilities by a number having the value of from 4 to 10.

Due to the enhanced permeability characteristics of plasticized polyvinyl chloride film, the film is the preferred packaging film. The presence of plasticizer enhances the permeability of the film and the permeability ratio of the film. In addition, the film has the necessary tensile strength, transparency, water transmission properties and can contain other materials such as antifogging agents.

The preferred film has a thickness of about 0.60 mil to about 1.35 mils. The moisture permeability of the preferred film is between about 6 to about 25 grams per 24 hours per 100 square inches per mil at 100° F. This permeability allows sufficient moisture to escape but retains enough moisture in the package to prevent the tomatoes from drying out.

Before packaging, the green tomatoes can be treated with ethylene and then packaged. The ethylene treatment triggers the ripening process and provides a uniformity of ripening time. It is preferred, however, that the tomatoes be ripened by natural processes in the package rather than by the ethylene triggered ripening process.

The preferred method of packaging tomatoes involves laying about 3 to 5 tomatoes, weighing about 500 grams, side by side on a flat rectangular tray having low side walls. The tray is of the type normally used in packaging tomatoes. The tray is then covered with a plastic film having the above described permeability characteristics. By this method, the tomatoes so packaged are protected from fungal or other infections during shipment and the ripening time is prolonged. The tomatoes may also be treated with antimicrobials prior to packaging. The tomatoes can be shipped in the same tray to the store where they are sold to the buying housewife. The package provides, in addition to its prolonging the ripening time and protecting against infection, an attractive article to be placed on the sales shelf. The film is preferably transparent and the housewife can inspect the contents visually. The film also allows the tomatoes to remain in their bright red ripe condition while on the shelf of the store for a prolonged period of time.

While the tomatoes may be bagged or stacked, it is preferred that they be laid flat and not stacked, as this gives a larger surface area of the film overwrap and, therefore, allows for freer respiration of the tomatoes. The film which is employed in wrapping the tomatoes has a surface area of from 100 to 250 and preferably from 150 to 200 per kilogram of tomatoes.

The composition of the films which may be employed in the practice of the present invention is not critical, as long as the films have the proper permeability as described above and the proper ratio of carbon dioxide to oxygen permeability.

Film systems which have been successfully employed in the practice of the present invention include film made from ethylene-vinyl acetate copolymer and film made from plasticized polyvinyl chloride and copolymers thereof.

The ethylene-vinyl acetate copolymer preferably contains at least 10 percent of vinyl acetate. The higher the polyvinyl acetate content, the higher the permeability of this film. The ethylene-vinyl acetate copolymer films are available from Union Carbide and from U.S. Industrial Chemical Corp. The plasticized polyvinyl chloride films are the preferred films. The term polyvinyl chloride includes copolymers of polyvinyl chloride. For example, the polyvinyl chloride can also be a copolymer of polyvinyl chloride and polyvinyl acetate or mixtures of the homopolymers of the two. Other copolymers of polyvinyl chloride that can be used are the $C_1$ to $C_8$ alkyl esters of alpha-unsaturated aliphatic acids having 3 to 5 carbon atoms to the molecule of said acid. Examples of the alkyl esters include methyl, ethyl and octylacrylate and methacrylate. The copolymers and mixtures of the homopolymers provides satisfactory films for packaging tomatoes.

The plasticizer is present in the proportion of between about 20 to 60 parts by weight per 100 parts of vinyl polymer resin. The preferable plasticizers which can be used in the formulation include di (2-ethylhexyl) adipate and di (2-ethylhexyl) phthalate. Other plasticizers which can be used include acetyl tributylcitrate, epoxidized soybean oil, butyl phthalyl butyl glycolate, di isobutyl adipate, diphenyl (2-ethylhexyl) phosphate, butyl benzyl phthalate, and the like and mixtures thereof. The total plasticizer concentration in the vinyl film should generally be between about 20–60 parts by weight of plasticizer for 100 parts by weight of vinyl film and preferably be at least 30 parts. The higher plasticizer levels result in higher permeabilities are preferred.

Other additives to the film composition may include usual stabilizers for polyvinyl chloride film such as, for example, triphenyl phosphate, nonylphenol, barium, cadmium, calcium, and zinc salts of lauric and other fatty acids and mixtures thereof.

An antifogging agent may also be present. The antifogging and anti-tackifying agent is a partial ester of water soluble polyols and aliphatic monocarboxylic acids (referred to as partial ester 1) and polyalkoxylated derivatives of a partial ester of water soluble polyols and aliphatic monocarboxylic acids (referred to as partial ester 2).

Partial ester 1 is a partial (such as mono-ester) of a water soluble $C_{2-6}$ polyol which polyol contains at least two alcohol groups. A minimum of one of such alcohol groups are not reacted with acid to form the ester and at least one of such alcohol groups are reacted with acid to form the ester. The polyol component of this partial ester may be glycerol; ethylene, propylene or other $C_{2-4}$ glycols, trimethylol propane, sorbitol, and the like. The acid component may be any $C_{12-18}$ aliphatic monocarboxylic acid, examples of which are oleic, lauric, palmitic, stearic and the like acids.

Partial ester 2 is a polyalkoxylated derivative of a partial ester of a water soluble $C_{2-6}$ polyol which polyol contains at least two alcohol groups. A minimum of one of such alcohol groups are not reacted with acid to form the ester, and at least one of such alcohol groups are reacted with acid to form the ester. The polyol component of this partial ester may be glycerol; ethylene; propylene or other $C_{2-4}$ glycols; trimethylol propane; sorbitol; sorbitan and the like. The acid component may be any $C_{12-18}$ aliphatic monocarboxylic acid, examples of which are lauric, palmitic, oleic, stearic and like acids. The alkoxylated groups of said partial ester 2 each have between about 2 to 3 carbon atoms, per repeating alkoxyl unit. The number of alkoxylated groups may be between about 3–30 per molecule of the alkoxylated partial ester. Illustrative examples are polyoxyethylene sorbitan monooleate, polyoxypropylene propylene glycol monooleate, polyoxybutylene trimethylol propane monooleate and the corresponding stearates, laurates, palmitates, etc., said partial esters having 5–25 alkoxylated groups to the molecule are usually preferred. The best results are generally obtained with polyoxyethylene sorbitan monooleate having about 20 oxyethylene groups to the molecule.

In order to impart antifogging properties to a vinyl film, both partial esters must be present in the composition. From the point of view of strictly antifogging properties in the film, we have found that 2 parts (about) by weight of each ester for 100 parts of polymeric vinyl resin will result in good nonfogging properties in a film or sheet made from said resin. However, when relatively high proportions of common plasticizers are included in the film formulation in order to obtain greater gas diffusion through the film, we prefer to have excess of 2 parts and about at least 3 parts of partial ester 1 added to the film formulation in order to maintain the high level of antiblocking properties of the film.

There may also be included food colors to establish the color desired.

Generally, the polymeric vinyl resin, plasticizer, etc., are heated and/or subjected to high shear and thus blended. When heat is used in blending, the temperature is such that it is sufficient to provide adequate penetration of the plasticizer and said agent into the vinyl resin. The solution is then extruded, drawn, blown or in any other convenient manner made into a film or sheet. The thickness of the film or sheet can be varied as desired, however, it has been found that a useful thickness for packaging tomatoes is between about .1 mil and 2 mils, preferably about 0.60 to 1.35 mils. Thickness greater than 2 mils may require additional plasticizer to attain the desired gas permeability rates.

The permeability data used in the following examples was obtained using a method developed by Professor Seymour Gilbert at Rutgers University. The procedure is set forth in an article written by him in the January 1969, issue of Package Engineering at pages 66 through 69. The oxygen and carbon dioxide permeabilities are expressed in cubic centimeters per 100 square inches per 24 hours per atmosphere per the film thickness. The water vapor transmission rate is given in units of grams per 100 square inches per 25 hours at 100° F. (90% relative humidity). The gas permeability data was obtained at 24° C.

In the examples as elsewhere in the specification and claims, parts and percentages are by weight unless expressed otherwise.

EXAMPLE I

Three groups of tomatoes representing the three different stages of ripening were packaged using a plasticized polyvinyl chloride film. The film had a thickness of 0.75 mil, a water transmission rate of 20, an oxygen permeability of 2,150 and a carbon dioxide permeability of 11,000. Of the three groups, Group 1 consisted of green tomatoes and green tomatoes with a show of pink color on the blossom end, Group 2 of pink tomatoes and Group 3 of red tomatoes.

Tomatoes from each group weighing approximately 0.5 kilogram were placed in a typical rectangular tomato tray which were then overwrapped with film and sealed from the bottom. The packages were stored at 73° F. for a period of 9 days.

At the expiration of 9 days of storage, some of the packages were opened and the tomatoes of all three groups appeared fresh and turgid. No mold or growth was observed on any tomatoes.

After 12 days, 3 days after the packages were opened, the tomatoes which had been pink on the blossom end and the pink tomatoes developed a full red color. The color was the same shade as that developed on control tomatoes which had been stored under normal atmospheric conditions after 5 days of storage. The tomatoes which remained in the package eventually ripened. The time which was required for ripening was dependent upon the stage of ripening when packaged.

Unpackaged control tomatoes of the three groups all spoiled much sooner than the packaged counterparts.

EXAMPLE II

The procedure of Example I was repeated except that the film used was a plasticized polyvinyl chloride film having a thickness of 0.75 mil, a water vapor transmission rate of 15, an oxygen permeability of 850, and a carbon dioxide permeability of 4,200.

Some of the packages were opened after 9 days, and the following results were observed. The green tomatoes and the green tomatoes with pink on the blossom end were observed to be partially infected by mold and suffering from softening of texture. They also had a bad odor and a sour taste. The tomatoes of Groups 2 and 3, that is the pink and red tomatoes, had no mold infection. The red tomatoes had a good flavor and pleasant odor as well as good texture. The pink tomatoes proceeded to ripen to full red color in about 7 days after the packages were opened and had a good flavor, odor and texture. The pink tomatoes which remained in the package (Group 2) eventually turned red and remained red over a prolonged period.

EXAMPLE III

The procedure of Example I was repeated except that the film used was a plasticized polyvinyl chloride film having a thickness of 0.75 mil, a water vapor transmission rate of 7, a carbon dioxide permeability of 714, and an oxygen permeability of 94.

The packages were stored at 73° F. for a period of 9 days. The tomatoes of Groups 1 and 2, that is the green, the green with pink on the blossom end and the pink, all retained their initial color, but all suffered from mold infection of varying degrees, softening of texture and a strong off-flavor and an off-odor. The tomatoes of Group 3, the red tomatoes, were free of mold infection and had good texture and flavor.

EXAMPLE IV

Examples I to III were repeated except that the temperature was lowered to 58° F. Essentially the same results were obtained except that the ripening and storage time were somewhat extended.

EXAMPLE V

The procedure of Example III was repeated except that the packages of tomatoes were stored for 12 days at 73° F. Only the tomatoes which were red initially were found to be free from mold infection and had good texture and color.

EXAMPLE VI

The procedure of Example V was repeated except the storage temperature was lowered to 58° F. Similar results were observed.

EXAMPLE VII

The procedure of Example I was repeated except that the film used was a plasticized polyvinyl chloride packaging film having a thickness of 0.75 mil, a water vapor transmission rate of 15, an oxygen permeability of 332, and a carbon dioxide permeability of 2,500.

The packages were kept sealed for 12 days before opening. The tomatoes of Group 1, that is the green tomatoes and the green tomatoes with pink on the blossom end, suffered from a softening of texture and they had a bad odor and a sour taste. Tomatoes of Groups 2 and 3, that is the pink and red tomatoes, were not adversely affected. The red tomatoes had a good flavor and a pleasant odor and a good texture. The pink tomatoes, after exposure, proceeded to ripen to full red color in about 7 days and had a good flavor, odor and texture. The pink tomatoes which remained packaged ripened over a prolonged period.

Having thus described our invention, what we desire to secure by Letters Patent of the United States is:

1. A method of packaging green tomatoes and green tomatoes with pink on the blossom end consisting essentially of:
   (a) completely wrapping the tomatoes in an imperforate gas permeable film having an oxygen permeability of about 1,000 to 3,000 cc. per 100 square inches per 24 hours per atmosphere, and a carbon dioxide permeability of 4 to 10 times as great as the permeability to oxygen with the further provision that the permeability to carbon dioxide be not less than 5,000 nor more than 20,000 cc. per 100 square inches per 24 hours per atmosphere;
   (b) sealing the film around the tomatoes so wrapped; and
   (c) allowing the tomatoes to ripen in the sealed imperforate gas permeable film.

2. The method of claim 1, where the film has an oxygen permeability of about 1,000 to 2,500 cc. per 100 square inches per 24 hours per atmosphere.

3. The method of claim 1, wherein the film is a plasticized polyvinyl chloride film.

4. The method of claim 1, wherein the film has a thickness of about 0.60 mil to about 1.35 mils.

5. The method of claim 1, wherein the film is a plasticized polyvinyl chloride film having a thickness of from about 0.60 mil to about 1.35 mils.

6. The method of claim 1, wherein the moisture permeability is between about 6 to about 25 grams per 24 hours per 100 square inches per mil at 100° F.

7. A method of packaging pink tomatoes consisting essentially of:
   (a) completely wrapping the pink tomatoes in an imperforate gas permeable film having an oxygen permeability of about 200 to 3,000 cc. per 100 square inches per 24 hours per atmosphere, and a carbon dioxide permeability of 4 to 10 times as great as the permeability to oxygen with the further provision that the permeability to carbon dioxide be not less than 1,500 nor more than 20,000 cc. per 100 square inches per 24 hours per atmosphere;
   (b) sealing the film around the tomatoes so wrapped; and
   (c) allowing the tomatoes to ripen in the sealed imperforate gas permeable film.

8. The method of claim 7 wherein the film has an oxygen permeability of about 300 to 2,500 cc. per 100 square inches per 24 hours per atmosphere.

References Cited
UNITED STATES PATENTS

| | | | |
|---|---|---|---|
| 3,630,759 | 12/1971 | Rumberger | 99—171 LP |
| 3,411,894 | 11/1968 | Lieberman et al. | 99—154 X |
| 3,289,386 | 12/1966 | Farmer | 53—28 |
| 3,639,318 | 2/1972 | Tijunelis | 99—171 LP X |
| 3,423,212 | 1/1969 | Purcell et al. | 99—171 LP |
| 2,571,340 | 10/1951 | Carson | 99—171 LP |
| 3,450,543 | 6/1969 | Badran et al. | 99—171 R |
| 3,450,544 | 6/1969 | Badran et al. | 99—171 R |

OTHER REFERENCES

Modern Packaging Encyclopedia, McGraw-Hill, 1968, pp. 165 and 185, vol. 41 #7A; vol. 44 #7A, 1971, p. 138.

FRANK W. LUTTER, Primary Examiner

S. L. WEINSTEIN, Assistant Examiner